United States Patent
Sharma et al.

(10) Patent No.: US 11,902,271 B2
(45) Date of Patent: Feb. 13, 2024

(54) TWO-WAY SECURE CHANNELS BETWEEN MULTIPLE SERVICES ACROSS SERVICE GROUPS

(71) Applicant: EMC IP Holding Company LLC, Hopkinton, MA (US)

(72) Inventors: Anurag Sharma, Cedar Park, TX (US); Yedidia Atzmony, Zichron Yaakov (IL); Shoham Levy, Ra'anana (IL); Joji John, Bangalore (IN); Eric Dequin, Montigny le Bretonneux (FR)

(73) Assignee: EMC IP Holding Company LLC, Hopkinton, MA (US)

( * ) Notice: Subject to any disclaimer, the term of this patent is extended or adjusted under 35 U.S.C. 154(b) by 431 days.

(21) Appl. No.: 17/224,651

(22) Filed: Apr. 7, 2021

(65) Prior Publication Data
US 2022/0329584 A1    Oct. 13, 2022

(51) Int. Cl.
*H04L 29/06* (2006.01)
*H04L 9/40* (2022.01)
*H04L 9/30* (2006.01)
*H04L 9/32* (2006.01)

(52) U.S. Cl.
CPC ............ *H04L 63/0823* (2013.01); *H04L 9/30* (2013.01); *H04L 9/3263* (2013.01)

(58) Field of Classification Search
CPC ...... H04L 63/0823; H04L 9/30; H04L 9/3263
See application file for complete search history.

(56) References Cited

U.S. PATENT DOCUMENTS

| 11,246,032 | B1 | 2/2022 | Maass et al. | |
| 2016/0127353 | A1 | 5/2016 | Thomas et al. | |
| 2016/0373433 | A1* | 12/2016 | Rivers | H04L 9/3265 |
| 2017/0033935 | A1 | 2/2017 | Clark et al. | |
| 2017/0012786 | A1 | 6/2017 | Gallagher | |
| 2019/0068581 | A1* | 2/2019 | Yamamoto | H04L 9/0891 |

(Continued)

OTHER PUBLICATIONS https://www.esecurityplanet.com/networks/how-to-run-your-own-certificate-authority/, downloaded on Mar. 26, 2021.

(Continued)

*Primary Examiner* — Evans Desrosiers
(74) *Attorney, Agent, or Firm* — Ryan, Mason & Lewis, LLP

(57) ABSTRACT

Two-way secure channels are provided between multiple services across service groups, where the certification is performed by a certificate authority associated with one of the service groups. One method comprises a first service providing a first handshake communication with a first token to a second service, wherein the first service obtains the first token by authenticating with an identity and access management service having a first certificate signed by a certificate authority, wherein the first handshake communication succeeds when the second service has a second certificate signed by the certificate authority, and wherein the second service obtains a second token by authenticating with the identity and access management service. The first service receives a second handshake communication from the second service with the second token. Communications are enabled between the first and second services over a two-way authenticated channel when the first service has a third certificate signed by the certificate authority.

20 Claims, 9 Drawing Sheets

(56) References Cited

U.S. PATENT DOCUMENTS

2020/0050759 A1     2/2020   Duttachoudhury et al.
2021/0184869 A1*   6/2021   Trere .................... H04L 9/3268

OTHER PUBLICATIONS https://searchsecurity.techtarget.com/definition/private-CA-private-PKI, downloaded on Mar. 26, 2021.
https://www.globalsign.com/en/blog/3-reasons-to-run-an-internal-ca-to-reconsider, downloaded on Mar. 26, 2021.
https://www.securew2.com/blog/creating-private-certificates, downloaded on Mar. 26, 2021.

* cited by examiner

TWO-WAY SECURE CHANNELS BETWEEN MULTIPLE SERVICES ACROSS SERVICE GROUPS

FIELD

The field relates generally to information processing systems, and more particularly to authentication techniques in such systems.

BACKGROUND

When deploying a software system across an untrusted network, a trusted connection is established between system components to protect against, for example, man in the middle (MITM) and/or spoofing attacks. Trust is often achieved by agreeing on a common certificate authority (CA) to sign a certificate for each system component. A number of protocols allow one entity to identify and trust another entity by evaluating a certificate signed by the common CA.

A need exists for improved techniques for authenticating communications.

SUMMARY

In one embodiment, a method comprises providing, by a first service in a first service group, a first handshake communication with a first token to a second service in a second service group, wherein the first service obtains the first token by authenticating with an identity and access management service having a first certificate signed by a CA in the first service group, wherein the first handshake communication between the first service and the second service succeeds in response to the second service having a second certificate signed by the CA, and wherein the second service obtains a second token by authenticating with the identity and access management service having the first certificate; receiving, by the first service, a second handshake communication from the second service with the second token; and enabling communications between the first service and the second service over a two-way authenticated channel in response to the first service having a third certificate signed by the CA.

In some embodiments, a trust of the CA is established in: (i) the first service group by storing a public key of the CA to a data store of one or more services in the first service group, and/or (ii) the second service group by storing the public key of the CA to a data store of one or more services in the second service group. The second service can obtain the second certificate in response to a certificate signing request provided by the second service to the CA. The first service may obtain the third certificate using a certificate management service in the first service group.

Other illustrative embodiments include, without limitation, apparatus, systems, methods and computer program products comprising processor-readable storage media.

DETAILED DESCRIPTION

Figure 1:
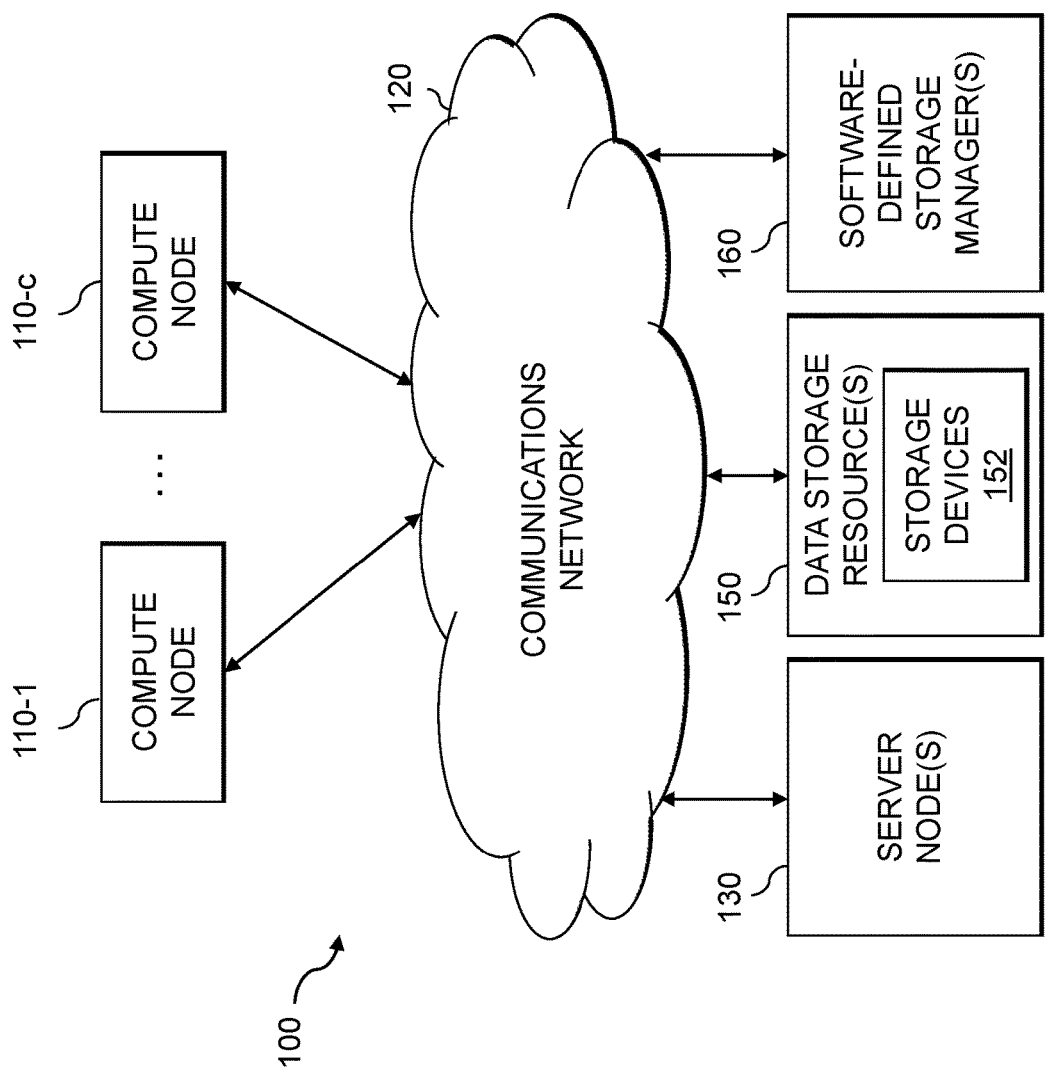
FIG. 1 is a high-level schematic illustration of a computing system comprising a software-defined storage system that provides two-way secure channels between two services, according to an exemplary embodiment of the disclosure.

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide methods, apparatus and computer program products for providing two-way secure channels between multiple services across service groups.

A number of computing systems, such as software-defined storage systems, employ multiple software levels or planes to separate system functionality. A control plane in a software-defined storage system, for example, is a software layer that manages data stored across one or more storage pools that are implemented by one or more storage systems. The control plane typically manages data provisioning and may orchestrate data services across these storage pools. A data plane in a software-defined storage system, for example, is a software layer that manages data layout, storage devices, and input/output operations for data stored on storage devices, as discussed further below. In some embodiments, one or more of the services in the control plane are part of a first service group and one or more of the services in the data plane are part of a second service group. The second service group may comprise, for example, any service that is not in the first service group. A given service group may comprise one or more services.

In one or more embodiments, a CA is provided as part of a control plane that signs certificates of both the control plane and the data plane. Thus, the control plane having the CA may be considered a trusted domain in at least some embodiments. The certificate of the CA in the control plane may optionally be signed by another certificate authority, such as a customer root certificate authority, to establish a chain of trust in a data center. In this manner, a customer can trust one CA in order to consume management services provided by the control plane.

A data plane may include a reusable service, such as a software-defined network attached storage (SDNAS) service. Such a reusable service is often self-contained and may include automation to generate its own certificates and an intermediate CA that signs internal certificates. The certificate generation and signing automation in SDNAS, for example, allows SDNAS to carry out a consistent installation and configuration behavior across multiple software-defined solutions.

A chain of trust is often needed between control plane and data plane services. It may not be practical for a customer to anchor its root CA with multiple intermediate CAs or to sign so many certificates, especially when certificates are rotated every month or quarter to meet security guidelines. As noted above, a first service group may comprise one or more of the services in the control plane and a second service group may comprise one or more of the services in the data plane. Thus, in at least some embodiments, one or more of the services in the control plane (having the CA) are part of a first service group within a trusted domain and one or more of the services in the data plane are part of a second service group outside of the trusted domain (at least initially).

In one or more embodiments, the disclosed techniques for providing two-way secure channels between multiple services across the control and data planes allow data plane services to leverage a CA hosted by the control plane to obtain one or more signed certificates. In addition, Transport Layer Security (TLS) trust is established between the control plane and the data plane for REST API (Representational State Transfer Application Programming Interface) based communications, as discussed further below.

While one or more embodiments of the disclosure are illustrated herein using communications between multiple services across multiple service groups in a storage environment, the disclosed techniques for providing two-way secure channels with certification by a CA associated with one of the service groups of the communication can be employed for communications between any two services in a multi-service communication environment, as would be apparent to a person of ordinary skill in the art.

FIG. 1 is a high-level schematic illustration of a computing system comprising a software-defined storage system that provides two-way secure channels between multiple services, according to an exemplary embodiment of the disclosure. More specifically, FIG. 1 schematically illustrates a computing system 100 which comprises a plurality of compute nodes 110-1 through 110-c (collectively referred to as compute nodes 110), a communications network 120, one or more server nodes 130, one or more data storage resources 150 and one or more software-defined storage managers 160, as discussed further below in conjunction with FIG. 2. One or more server nodes 130 may comprise a software-defined storage control system (not shown in FIG. 1). Each of the data storage resources 150 comprise one or more storage devices 152.

The compute nodes 110 include various types of applications that issue data input/output (I/O) requests to storage volumes. For example, the compute nodes 110 may include user applications, server applications, database applications, virtual machines and containers. The compute nodes 110 can be hosted by, and execute on, various types of computing devices and systems including, but not limited to, desktop computers, laptop computers, workstations, computer servers, enterprise servers, rack servers, smart phones and electronic tablets.

While the communications network 120 is generically depicted in FIG. 1, it is to be understood that the communications network 120 may comprise any known communication network such as a global computer network (e.g., the Internet), a wide area network (WAN), a local area network (LAN), an intranet, a satellite network, a telephone or cable network, a cellular network, a wireless network such as Wi-Fi or WiMAX, a storage fabric (e.g., Ethernet storage network), or various portions or combinations of these and other types of networks. The term "network" as used herein is therefore intended to be broadly construed so as to encompass a wide variety of different network arrangements, including combinations of multiple networks possibly of different types, which enable communication using, e.g., Internet Protocol (IP) or other communication protocols such as Fibre Channel data transfer protocol, and an iSCSI (Internet Small Computer Systems Interface) data transfer protocol, to support storage network connectivity.

In some embodiments, the data storage resources 150 comprise direct-attached storage (DAS) resources (internal and/or external storage resources of the server node 130), wherein the storage devices 152 are virtually pooled into shared block storage by the control system. For example, the storage devices 152 include the same type, or a combination of different types of persistent storage devices (e.g., physical block devices) such as hard disk drives (HDDs), solid-state drives (SSDs) (e.g., flash storage devices), peripheral component interconnect express (PCIe) flash cards, or other types and combinations of non-volatile memory. The data storage resources 150 are directly connected to the server node 130 through, e.g., a host bus adapter, and using suitable protocols such as ATA (AT Attachment), SATA (Serial ATA), eSATA (external Serial ATA), non-volatile memory express (NVMe), SCSI, and SAS. In an exemplary embodiment, the storage devices 152 include both HDD and SSD storage devices. As is known in the art, SSD storage devices provide faster storage performance than HDD devices.

While FIG. 1 generally depicts the software-defined storage environment having a single server node 130, it is to be understood that in other embodiments, the system 100 of FIG. 1 can implement a server cluster of two or more server nodes 130 (e.g., hundreds of server nodes), wherein each server node 130 deploys its own control system. In this instance, the control system of each server node converts the local storage resources (e.g., DAS resources) of the server node into block storage and contributes the block storage to the server cluster to implement a server-based storage area network (SAN) (e.g., a virtual SAN), wherein each server node is part of a loosely coupled server cluster which enables "scale-out" of the software-defined storage environment.

In the software-defined storage environment of FIG. 1, for purposes of discussion, the term "node" or "server node" as used herein refers to a single server node (e.g., one server node 130) which comprises physical block devices (e.g., HDD devices and SSD devices). The control system exposes abstractions of block devices (e.g., virtual block devices). For example, a virtual block device can correspond to a volume of a storage pool. Each virtual block device spans across any number of actual physical storage devices, which are referred to herein as "storage pools." For illustrative purposes, it is assumed that each "storage pool" is homogenous in terms of the type of storage devices within the group (e.g., a storage pool can include only HDD devices or SSD devices). In addition, different storage pools can have the same type of storage device, but a different number of storage devices. For example, a first storage pool can include 10 HDDs, a second storage pool can include 100 HDDs, a third storage pool can include 50 SSDs, and a fourth group can include 100 SSDs.

The control system is a component of the software-defined storage environment shown in FIG. 1. In some embodiments, the software-defined storage environment comprises other components such as data clients, which are not specifically shown in FIG. 1. The control system comprises a software layer that is deployed on one or more server nodes 130 and configured to provision, orchestrate and manage the physical data storage resources 150. For example, the control system implements methods that are configured to create and manage storage pools by aggregating capacity from the physical storage devices 152 (e.g., virtual pools of block storage).

The control system supports the virtualization of storage by separating the control and management software from the hardware architecture. The control system is configured to abstract storage access services from the underlying storage hardware to thereby control and manage I/O requests issued by the compute nodes 110, as well as to support networking and connectivity.

On the client-side, a storage data client (SDC) may be deployed in each host application server which hosts one or more of the compute nodes 110 that require access to the block devices exposed and managed by the control system. The SDC exposes block devices representing the virtual storage volumes that are currently mapped to that host. In particular, the SDC serves as a block driver for a client (server) to access the block storage that is managed by the control system. The SDC provides the operating system or hypervisor (which runs the SDC) access to the logical block devices (e.g., volumes). The SDCs have knowledge of which control systems (e.g., control system) hold its block data, so multipathing can be accomplished natively through the SDCs. Metadata managers manage the SDC to control system data mappings.

As noted above, computing system 100 comprises a software-defined storage system that implements the disclosed techniques for providing two-way secure channels between multiple services across multiple service groups. In one exemplary implementation, the software-defined storage system may be implemented using the Dell EMC PowerFlex® software-defined storage solution, commercially available from Dell Technologies. Other software-defined storage systems include the ScaleIO™ software-defined storage product and/or the VxFlex OS® software-defined storage product.

Figure 2:
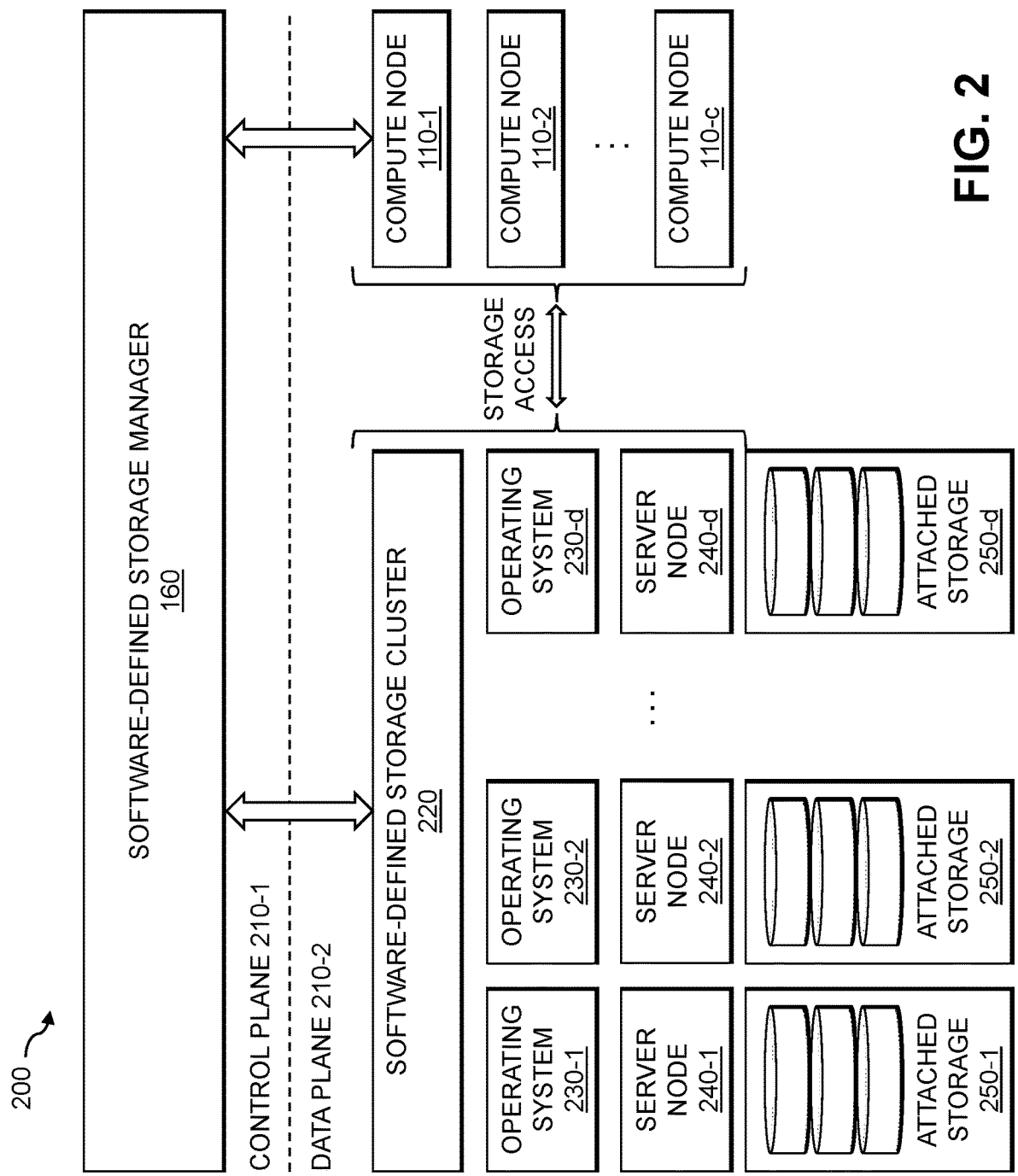
FIG. 2 illustrates an exemplary architecture for a representative software-defined storage system, according to some embodiments.

FIG. 2 illustrates an exemplary architecture for a representative software-defined storage system 200, according to some embodiments. In the example of FIG. 2, the software-defined storage system 200 is separated across a control plane 210-1 and a data plane 210-2. A software-defined storage manager 160 in the control plane 210-1 automates an initial deployment of one or more services and/or devices in the data plane, as discussed further below. Thus, the data plane 210-2 is installed, configured and managed via one or more automation services provided by the software-defined storage manager 160. In one or more embodiments, the software-defined storage manager 160 provisions, monitors and performs life cycle management functions for one or more services in the data plane 210-2.

In the example of FIG. 2, the software-defined storage system 200 comprises a software-defined storage cluster 220 and a plurality of compute nodes 110. The software-defined storage cluster 220 typically provides block, file and object services, as discussed further below in conjunction with FIG. 3, and further comprises a plurality of server nodes 240-1 through 240-d (collectively referred to herein as server nodes 240). Each server node 240 has a corresponding associated operating system 230 and a corresponding associated attached storage 250.

The server nodes 240 of the software-defined storage cluster 220 communicate with the compute nodes 110 using one or more storage access protocols, such as iSCSI, NAS (Network Attached Storage), Common Internet File System (CIFS), and/or S3 (Simple Storage Service) protocols.

The deployment steps include, in at least some embodiments, discovering server nodes 240 and switches, updating firmware, configuring BIOS (Basic Input/Output System), installing operating systems 230 and configuring the network. After deployment of the operating system 230, the management layer deploys the software-defined storage services and joins one or more servers into a cluster.

In one or more embodiments, the deployment steps are carried out by the control plane 210-1 in the management layer using a cryptographic network protocol (e.g., Secure Shell (SSH)) using frameworks such as a software provisioning, configuration management, an application deployment tool (e.g., Ansible), and a configuration management utility (e.g., Puppet) or similar tools. The SSH protocol, for example, uses encryption to secure the connection between a client and a server. All user authentication, commands, output, and file transfers are encrypted to protect against attacks in the network.

Once the data plane is configured, the communications between services from the control plane 210-1 and services from the data plane 210-2 are carried out over a secure management network using a REST API. As shown in FIG. 2, there are two security and network boundaries between the control and data planes 210. Thus, the REST API traffic is encrypted in at least some embodiments using TLS to avoid eavesdropping by a malicious network sniffer or a man-in-the-middle (MITM).

The services are configured with TLS certificates signed by a CA trusted by both the control plane 210-1 and the data plane 210-2. The trusted CA enables data plane services to identify control plane services by performing a TLS handshake and examining the certificate chain of trust during a REST API call, as discussed further below. Similarly, the trusted CA enables control plane services to identify data plane services by performing a TLS handshake and examining the certificate chain of trust during a REST API call, as discussed further below.

During a TLS handshake, the two communicating sides exchange messages to acknowledge each other, verify each other, establish the encryption algorithms they will use, and agree on session keys, in at least some embodiments.

Figure 3:
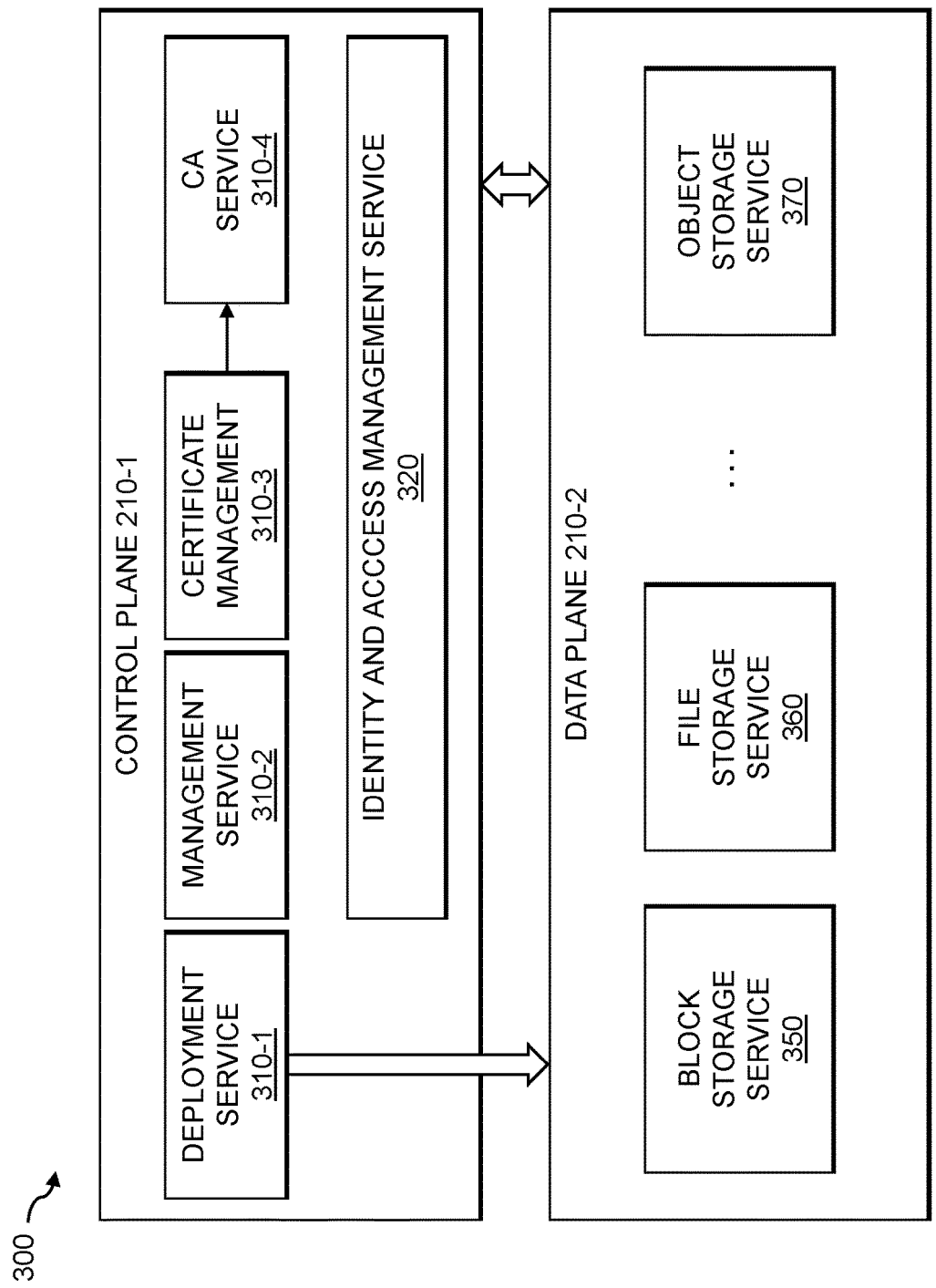
FIG. 3 illustrates a number of exemplary services deployed in the control plane and the data plane of FIG. 2, according to at least one embodiment.

FIG. 3 illustrates a number of exemplary services 300 deployed in the control plane 210-1 and the data plane 210-2 of FIG. 2, according to at least one embodiment. In some embodiments, one or more services 310 in the control plane 210-1 perform secure onboarding of at least one server and/or at least one service to generate the data plane 210-2. For example, a secure device onboarding (SDO) protocol may be used to perform the secure onboarding.

In the example of FIG. 3, the control plane 210-1 comprises one or more deployment services 310-1. The exemplary deployment services 310-1 perform one or more of the following functions:

enable secure automatic discovery of servers and/or switches required to generate the data plane 210-2;
categorize the servers and/or switches into a set of user-defined resource pools;

provide a template engine for deployment of a software-defined solution stack in a resource pool (where representative templates include network definition, operating system type, boot drive, and server/switch configuration parameters);

require a validated software bundle (firmware, drivers, operating system, software) for the software-defined solution stack;

perform qualification checks of the hardware in a resource pool for the software-defined solution stack before deployment;

provision servers and/or switches (for example, BIOS settings, Integrated Remote Access Controller (iRAC) or baseboard management controller (BMC) settings, partitioning of boot drive, installation of operating system, identification of server facing ports, configuration of virtual and physical switches for IP address, virtual LAN (VLAN) tagging, MTU (maximum transmission unit), and network interface card (NIC) teaming/bonding); and deployment of software services across servers and formation of clusters as per the software-defined solution stack.

In addition, the exemplary control plane 210-1 comprises one or more management services 310-2. The exemplary management services 310-2 perform one or more of the following functions:

maintain inventory of hardware components per server (e.g., NIC cards, disk drives, and mother board);

maintain inventory of software components per deployment;

perform drift management (of software, firmware, drivers and operating system) against a validated software bundle for the deployed solution stack;

perform health monitoring of hardware and software components across servers and switches;

monitor software components;

provide event and alert notifications via Simple Mail Transfer Protocol (SMTP), Simple Network Management Protocol (SNMP), and webhooks for unexpected health/performance metrics observed;

provide remote connectivity with backend to (i) automatically open a service ticket for sever issues, (ii) stream configuration and performance metrics for further analysis and (iii) download updates;

perform life cycle management of hardware (e.g., replacement of faulty field or customer replaceable units (CRU/FRU) by putting a server in the maintenance mode without causing data unavailability (DU) or data loss (DL); and perform a non-disruptive upgrade (NDU) of software components across cluster.

In addition, the exemplary control plane 210-1 comprises one or more certificate management services 310-3. The exemplary certificate management services 310-3 perform one or more of the following functions:

automatic generation of public key infrastructure (PKI) key pair for certificates required by services in the control plane;

automatic generation of certificate signing requests (CSRs) and signing of CSRs via CA for above certificates;

monitoring of certificate expiration and automatic renewal of certificates expiring in a configurable time, such as the next 30 days; and integration with the CA.

As noted above, the disclosed techniques for providing two-way secure channels between multiple services across the control plane and data plane employ a CA service 310-4 (e.g., from the Vault Open Source Project) in the control plane 210-1 to act as a CA and to provide secure access of this CA service 310-4 to one or more services in the data plane 210-2 so that the one or more services in the data plane 210-2 can submit their CSRs to get a certificate signed by this intermediate CA service 310-4. The exemplary CA service 310-4 performs one or more of the following functions:

provide various engines (e.g., key/value secret engine, PKI engine);

store private keys and secrets in an encrypted form;

integrate with Hardware Security Module (HSM) for managing encryption keys; and provide a web service CA for signing CSR and returning certificates.

In addition, the exemplary control plane 210-1 comprises one or more identity and access management services 320 (e.g., for authentication and authorization evaluations). The exemplary identity and access management services 320, such as Keycloak, perform one or more of the following functions:

provide standards-based Identity Provider (IDP) (e.g., supports OIDC, OAuth2.0, SAML2.0 protocols for authentication and authorization);

provide identity federation from customer IDP such as Active Directory, LDAP;

allow registration of microservices as service accounts within IDP to issue client ID/secret later used by a microservice to obtain a token (e.g., a JSON Web Token (JWT) to represent claims to be transferred between two parties);

issue signed JWTs to a client (service account or web user) after a successful authentication;

provide a well-known URL for clients to discover public key used for signing the JWT;

provide an API for issuing and validating JWT tokens;

provide an API and UI for User and Group management; and provide a login screen for web authentication to enable SSO (single-sign on).

As used herein, the term "token" is intended to be broadly construed, so as to encompass, for example, any informational element that conveys information related to an identity and/or other characteristics of an entity, such as claims of the entity. In some embodiments, the conveyed information is signed by the CA, for example, to enable detection of tampering and/or other modification of the informational content. In this manner, an attacker cannot change the identity or other characteristics of the token (for example, changing the role from a user to an administrator or changing the credentials of the entity).

In the example of FIG. 3, the exemplary data plane 210-2 comprises one or more block storage services 350. The exemplary block storage services 350 perform one or more of the following functions:

software-defined storage service for block storage (e.g., comprised of multiple software agents running on host operating system);

encapsulate attached disk drives from a set of x86 servers into storage pools;

organize servers into a set of protection domain or fault-sets;

provide interface to create volumes, snapshots and replication of snapshots;

enable mounting of volumes on a remote server as a block device;

channel write operations of binary data in various block sizes (e.g., 512 bytes, 1 KB, 1 MB) from a remote server to a volume and maintain redundant copies to improve reliability of data;

may include an intermediate CA to sign CSR of various internal software services (or, it may not have a CA but may generate a number of CSRs for internal software services which need to be signed by an external CA); and provide additional set of services (e.g., REST API Gateway and UI to present block storage management functions to end user).

Further, the exemplary data plane 210-2 comprises one or more file storage services 360. The exemplary file storage services 360 perform one or more of the following functions:

similar functions as block storage but specific to NAS; and provide additional set of services (e.g., REST API Gateway and UI to present file storage management functions to end user).

The exemplary data plane 210-2 also comprises one or more object storage services 370. The exemplary object storage services 370 perform one or more of the following functions:

similar functions as block storage but specific to object storage (e.g., S3); and provide additional set of services (e.g., REST API Gateway and UI to present object storage management functions to end user).

Figure 4:
FIG. 4 illustrates exemplary pseudo code for a control plane installation process, according to one embodiment of the disclosure.

FIG. 4 illustrates exemplary pseudo code for a control plane installation process 400, according to one embodiment of the disclosure. In the example of FIG. 4, the exemplary control plane installation process 400 includes the following steps in addition to the default installation:

In step 1, a certificate signing service (e.g., CA service 310-4) is installed, such as the Vault certificate signing service from the Hashicorp open source project.

In step 2, the exemplary control plane installation process 400 configures a CA certificate (e.g., from an anchoring customer root CA) in the certificate signing service to act as an intermediate CA. For example, the CA certificate can be configured in some embodiments using Vault, as follows:

$ vault secrets enable pki
$ vault secrets tune-max-lease-ttl=8760 h pki
$ vault write pki/root/generate/internal common_name=example.com\ttl=8760 h
$ vault write pki/config/urls\
issuing_certificates="https://ca.example.com:8200/v1/pki/ca"\
crl_distribution_points="https://ca.example.com:8200/v1/pki/crl"
$ vault write pki/roles/example-dot-com\
allowed domains=example.com\
allow subdomains=true\
max_ttl=72 h In this manner, the control plane installation process 400 enables PKI, increases the time-to-live (TTL), configures the CA certificate and private key for Vault to become the CA; updates a CRL (Certificate Revocation List) location and issuing certificates; and configures a role that maps a name in Vault to a procedure for generating a certificate. When users or devices generate credentials, they are generated against this role.

In step 3, the exemplary control plane installation process 400 installs and configures an identity and access management service provider (e.g., an OIDC ("OpenID Connect") provider, such as the Keycloak open source identity and access management solution, for securing REST API of control plane services via token authentication (e.g., a JWT authentication). Keycloak employs token-based authentication using OIDC and/or OAuth2.0.

In step 4, the exemplary control plane installation process 400 configures the authentication requirements of the certificate signing service API (e.g., the Vault API) to require token authentication (e.g., JWT authentication), for example, as follows:

$ vault write auth/oidc/config\
oidc_client_id="your_client_id"\
oidc_client_secret="your_client_secret"\
oidc_discovery_url="https://sso.example.com/auth/realms/demo/.well-known/openid-configuration"

In at least some embodiments, the control plane includes the certificate management service for automatically generating/renewing certificates for services hosted in the control plane. In step 5, the exemplary control plane installation process 400 configures the certificate management service for generating/renewing certificates for the services of the control plane. The certificate management service submits CSRs for an automatically generated certificate to the CA service which returns the signed certificate. The deployment process of services in the control plane includes an automation to get certificates via the certificate management service.

In step 6, the exemplary control plane installation process 400 configures the services in the control plane (including, for example, Keycloak) with the public key of the intermediate CA in their trust store at the time of installation in addition to their own certificate. This enables service-to-service communication over TLS within the control plane.

Figure 5:
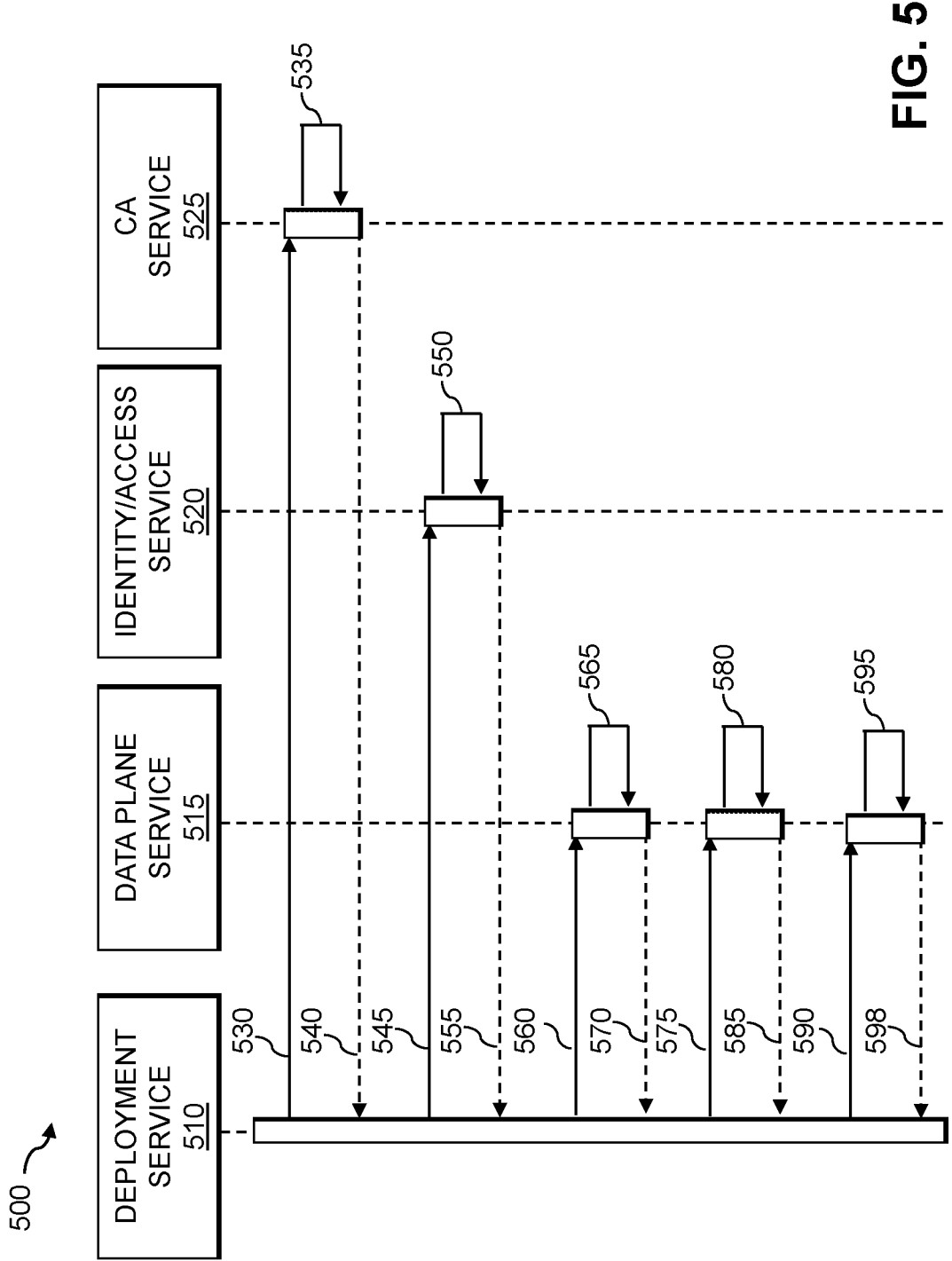
FIG. 5 illustrates an exemplary communication diagram for secure configuration of a data plane service with pre-requisite credentials, according to an embodiment of the disclosure.

FIG. 5 illustrates an exemplary communication diagram 500 for secure configuration of a data plane service 515 with prerequisite credentials, according to an embodiment of the disclosure. In the example of FIG. 5, the deployment service 510 of the control plane 210-1 performs an automated deployment of one or more data plane services 515 after provisioning the infrastructure (e.g., server, operating system and networking). The following steps of FIG. 5 are added, in some embodiments, to the deployment flow of the deployment service 510 to deploy and configure the data plane service 515:

Create an AppRole (application role) in the CA service 525, such as the Vault certificate signing service as the exemplary CA, in step 530 for the data plane service (where an "AppRole" represents a set of Vault policies and login constraints that must be met to receive a token with those policies). The CA service 525 creates the role in step 535 and provides the role to the deployment service 510 in step 540.

Register the data plane service 515 (with the above role) in step 545 into the identity and access management service 520 (e.g., Keycloak). The identity and access management service 520 creates a service account for the data plane service 515 to obtain, in step 550, a client identifier and a secret for JWT authentication, which are provided to the deployment service 510 in step 555.

Deployment service 510 then uses SSH in step 560 to copy the certificate of the CA service 525 (e.g., public key of the CA service 525) to a trust store of the host operating system of the data plane service 515 in step 565 using credentials configured for deployment. An acknowledgement is provided in step 570.

Deployment service 510 then uses SSH in step 575 to copy the credentials (e.g., ClientID, Secret, discovery URL/ token endpoint) of the identity and access management service 520 to a trust store of the host operating system of the data plane service 515 in step 580 using credentials configured for deployment. An acknowledgement is provided in step 585.

Deployment service 510 then uses SSH in step 590 to deploy data plane service 515. One or more data plane service automation steps are performed in step 595, and an acknowledgement is provided in step 598.

In the event of a transaction error, the data plane service is unregistered from the identity and access management service 520 and CA service 525.

After successful completion of the steps of FIG. 5, the data plane service 515 is able to invoke the REST API of the identity and access management service 520, CA service 525 and the management service(s) because the certificate presented by these control plane services is signed by the intermediate CA which is now configured as a trusted CA in the data plane service 515. Thus, once the data plane 210-2 is configured, the communication between services from control plane 210-1 and data plane 210-2 can be carried out over a secure management network via REST API. In this manner, the TLS trust configuration protects the data plane service from accidentally invoking a malicious REST endpoint pretending to be a control plane service.

Figure 6:
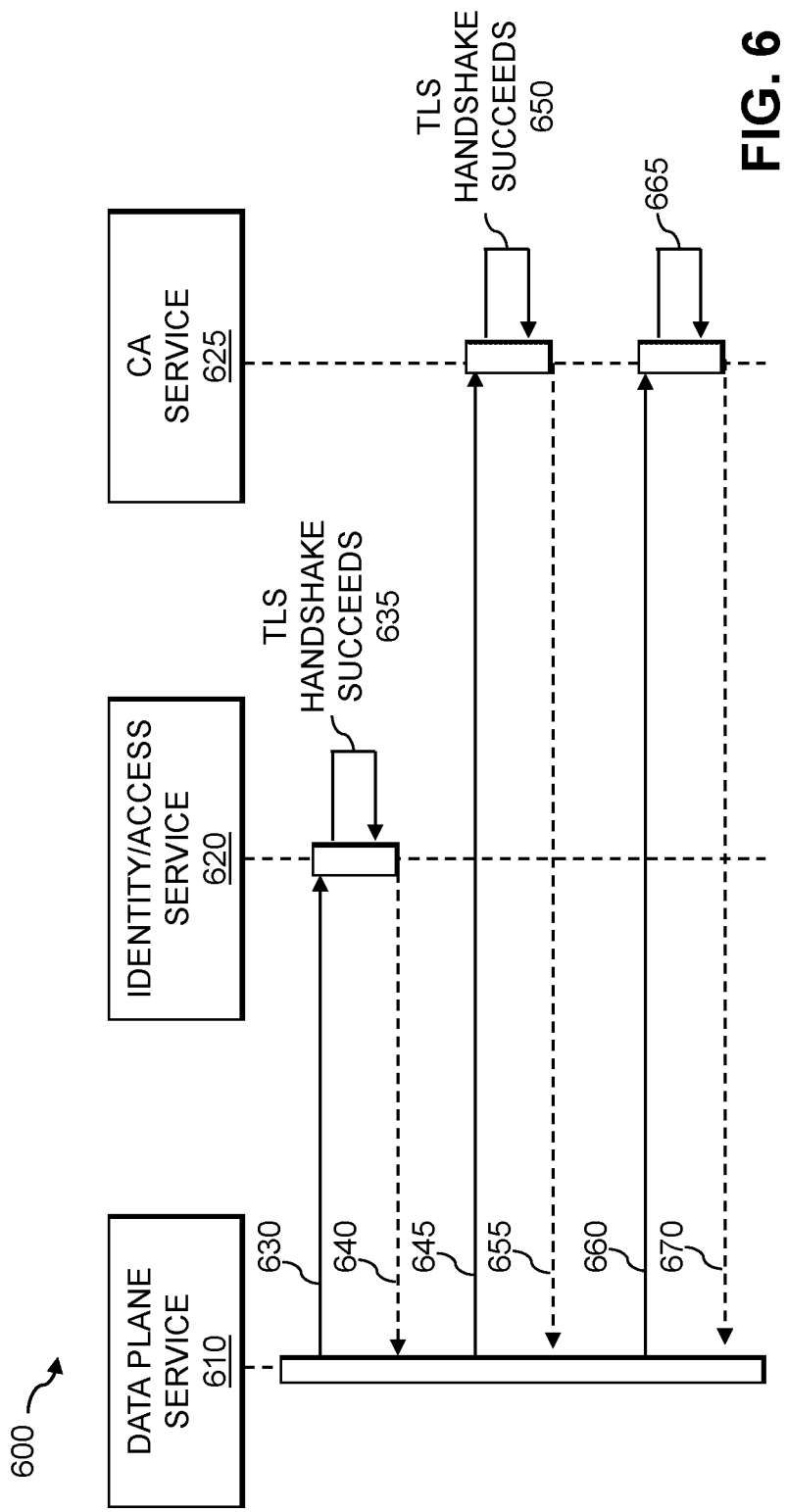
FIG. 6 illustrates an exemplary communication diagram for a data plane service to sign a certificate using the CA of the control plane, according to sone embodiments of the disclosure.

FIG. 6 illustrates an exemplary communication diagram 600 for a data plane service 610 to sign a certificate using the CA service 625 of the control plane 210-1, according to some embodiments of the disclosure. The data plane service 610 includes a process to automatically generate a number of certificates.

It is noted that tokens are generally short lived and could expire, for example, in 5 seconds. It is often recommended to start a new communication with a new token unless subsequent calls are made within 5 seconds and it is known that the existing token will not expire in transit. Thus, tokens are typically generated for every API call (but can be used multiple times within 5 minutes in the current example).

The disclosed techniques add the following steps of FIG. 6 to obtain the certificates signed by the CA service 625 of the control plane 210-1:

The data plane service 610 authenticates with the identity and access management service 620 in step 630 using the ClientID/secret configured in conjunction with FIG. 5. The TLS handshake passes in step 635 because the certificate of the identity and access management service 620 is signed by the CA service 625 which is trusted by the data plane service 610. Identity and access management service 620 verifies ClientID/secret combination and returns the JWT token to the data plane service 610 in step 640 with a Vault role.

The data plane service 610 then authenticates with the CA service 625 in step 645 using the obtained JWT token. The TLS handshake passes in step 650 because the certificate of the CA service 625 is signed by a CA service that is trusted by the data plane service 610. The CA service 625 verifies that the JWT token is valid and signed by a trusted OIDC provider and provides a token (e.g., a Vault token) to the data plane service 610 in step 655.

In step 660, the data plane service 610 generates a CSR for a certificate and invokes a certificate signing API of the CA service 625 using the token (e.g., the Vault token) to submit the CSR, as follows, for example:

```
$ curl \
    --header "X-Vault-Token: ..." \
    --request POST \
    --data @csr.json \
    https://ca.example.com:8200/v1/pki/issue/my-role.
```

The CA service 625 verifies the permissions of the data plane service 610 in step 665, and returns the signed certificate in step 670. The data plane service 610 can then store the signed certificate into a trust store.

After successful completion of the steps of FIG. 6, a control plane service is able to invoke the REST API of the data plane service 610 (using FIG. 7, discussed below) because the certificate presented by the data plane service 610 is signed by the same intermediate CA service 625 which is already configured as a trusted CA in the control plane service. In this manner, the TLS trust configuration protects the control plane service from accidentally invoking a malicious REST endpoint pretending to be a data plane service.

In some embodiments, the data plane service 610 may generate its PKI Pair and a CSR before implementing the steps of FIG. 6. The steps of FIG. 6, where the data plane service 610 has authenticated with the identity and access management service 520 and the CA service 525 via token generation and validation using shared credentials, also generates a certificate signing request, and the data plane service 610 submits the certificate signing request to the certificate manger to obtain a certificate. The data plane service 610 in the data plane 210-2 will use such a certificate to establish its identity and enable privacy (TLS encryption) and thus, trust between services of the control plane 210-1 and data plane 210-2.

It is noted that the data plane service 610 is just one of many such services that may be deployed in the data plane 210-2 at any time during the lifecycle of a given product.

Figure 7:
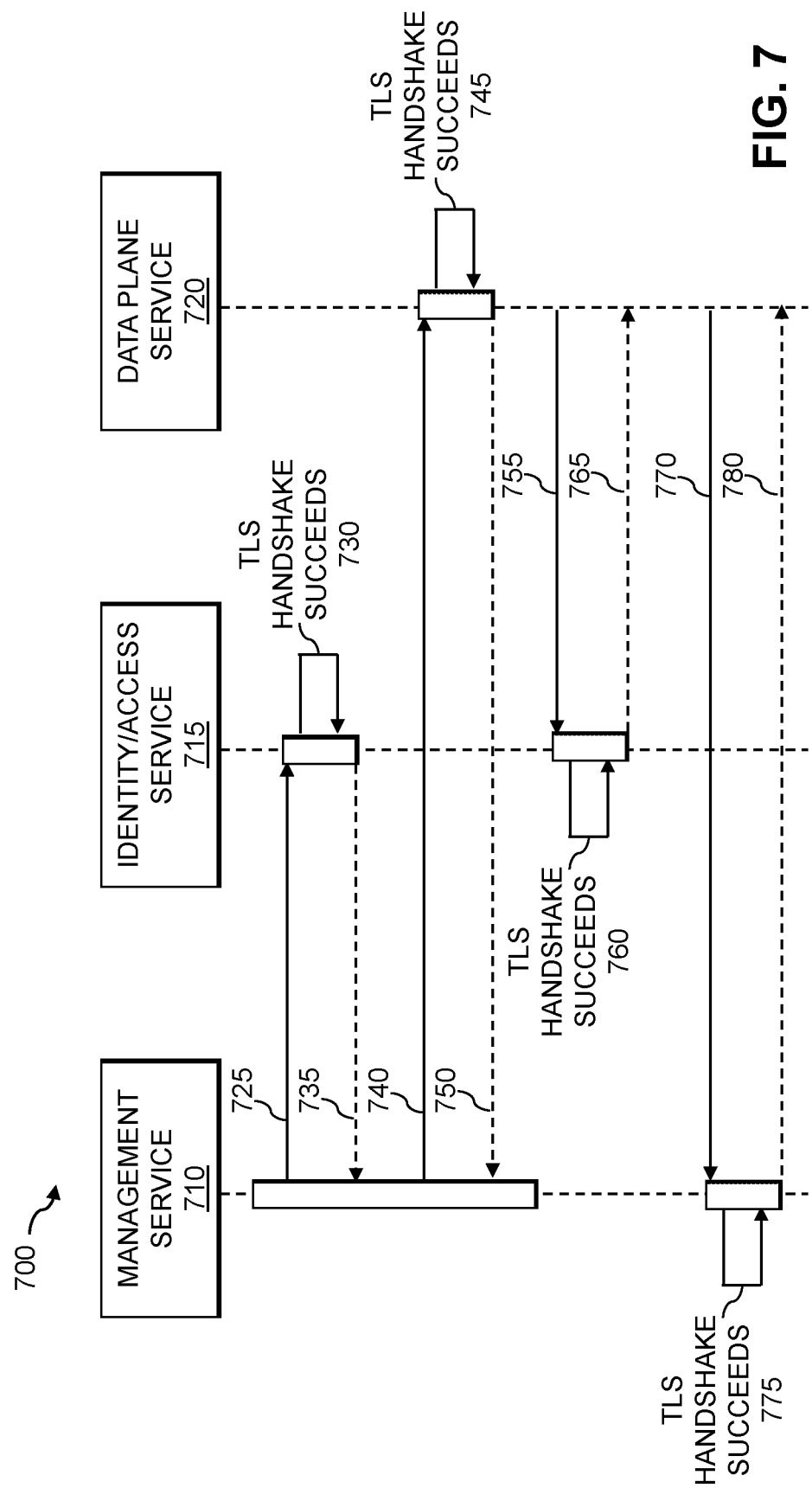
FIG. 7 illustrates an exemplary communication diagram illustrating communications between the control plane and the data plane, according to one or more embodiments.

FIG. 7 illustrates an exemplary communication diagram 700 illustrating a REST API call between the control plane 210-1 and the data plane 210-2, according to one or more embodiments. As noted above, communications between a control plane service (e.g., a management service 710) and a data plane service 720 are enabled over a two-way authenticated channel (e.g., mTLS) in response to the control plane service having a certificate signed by the certificate authority trusted by the data plane service 720.

In the example of FIG. 7, the management service 710 initially authenticates to the identity and access management service 715 (e.g., Keycloak) in step 725 using the client identifier and secret of the management service 710. The TLS handshake passes in step 730 because the Keycloak certificate is signed by the CA which is trusted by the management service 710. Thereafter, the management service invokes the REST API of the data plane service because the certificate presented by the data plane service is signed by the same CA that is already configured as a trusted CA in the management service. The identity and access management service 715 then provides a JWT token, in at least some embodiments, to the management service 710 in step 735.

Thereafter, the management service 710 invokes the REST API in step 740 of the data plane service 720 using the JWT token received in step 735. The TLS handshake passes in step 745 because the certificate of the data plane service 720 is signed by the CA which is trusted by the management service 710. The data plane service 720 sends an acknowledgement in step 750.

Likewise, the data plane service 720 authenticates to the identity and access management service 715 (e.g., Keycloak) in step 755 using the client identifier and secret of the data plane service 720. The TLS handshake in step 760 passes because the Keycloak certificate is signed by the CA which is trusted by the data plane service 720.

Thereafter, the data plane service 720 invokes the REST API of the management service 710 in step 770 using the JWT token received in step 765. The TLS handshake passes in step 775 because the certificate presented by the management service 710 is signed by the same CA that is already configured as a trusted CA in the data plane service 720. The management service 710 sends an acknowledgement in step 780.

Figure 8:
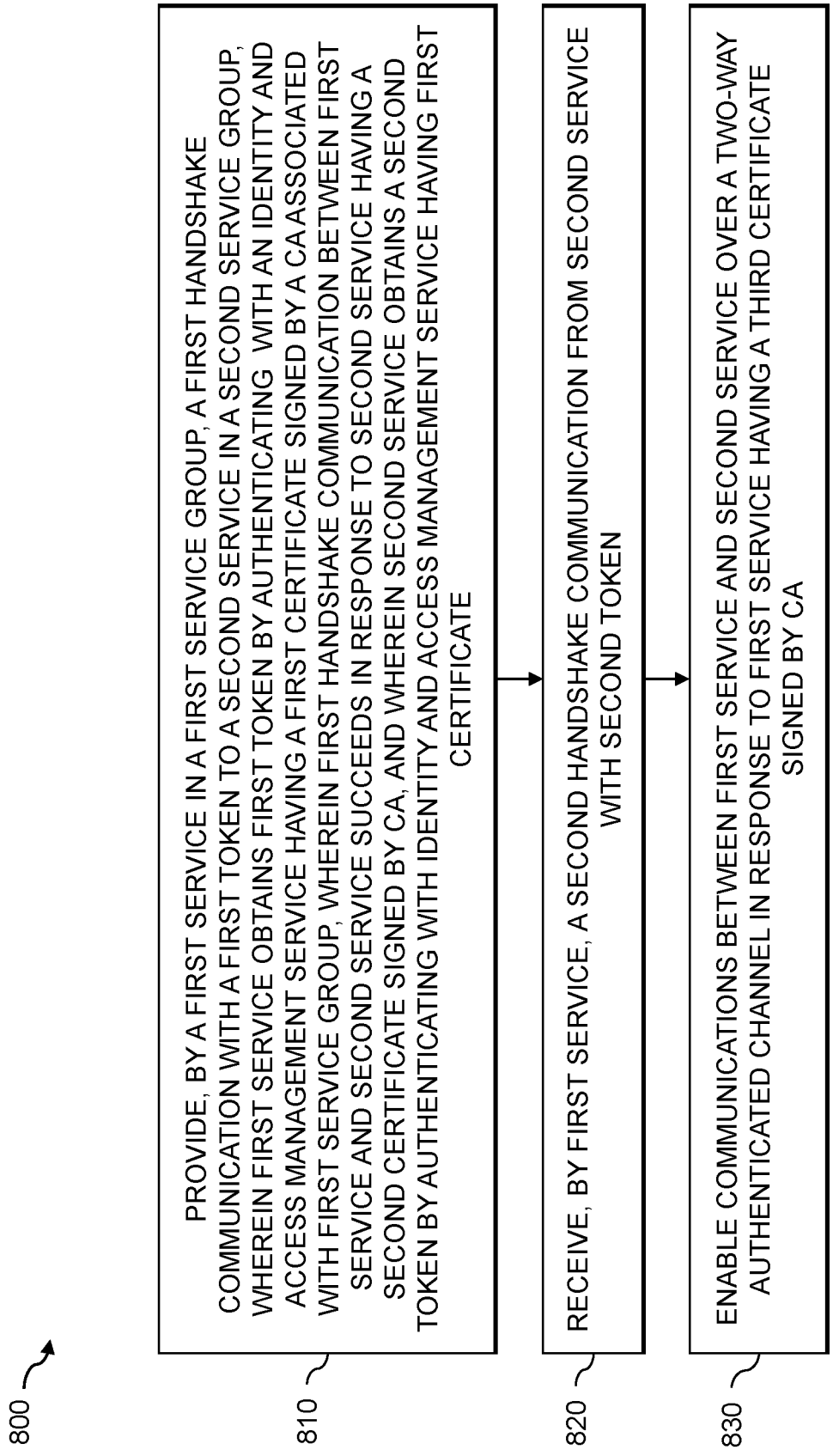
FIG. 8 illustrates an exemplary process for providing two-way secure channels between multiple services across service groups, according to an embodiment.

FIG. 8 illustrates an exemplary process 800 for providing two-way secure channels between multiple services across service group, according to an embodiment. As shown in FIG. 8, in step 810, a first service in a first service group provides a first handshake communication with a first token to a second service in a second service group, wherein the first service obtains the first token by authenticating with an identity and access management service having a first certificate signed by a CA associated with (e.g., in) the first service group, wherein the first handshake communication between the first service and the second service succeeds in response to the second service having a second certificate signed by the CA, and wherein the second service obtains a second token by authenticating with the identity and access management service having the first certificate.

In step 820, the first service receives a second handshake communication from the second service with the second token. Thereafter, communications are enabled in step 830 between the first service and the second service over a two-way authenticated channel in response to the first service having a third certificate signed by the CA.

In at least some embodiments, a trust of the CA is established in: (i) the first service group by storing a public key of the CA to a data store of one or more services in the first service group, and (ii) the second service group by storing the public key of the CA to a data store of one or more services in the second service group.

In one or more embodiments, the second service is deployed, by a deployment service in the first service group using a secure protocol by establishing a role for the second service with the CA; registering the second service with the identity and access management service to obtain credentials for the second service with the identity and access management service; storing a public key of the CA in a data store of the second service; storing the credentials of the second service with the identity and access management service in a data store of the second service; and performing one or more of predefined installation steps and predefined configuration steps associated with the second service.

In some embodiments, the second service uses a third token obtained from the identity and access management service to authenticate with the CA to obtain a fourth token from the CA, and wherein the second service uses the fourth token from the CA to obtain the second certificate from the CA. The CA may provide the third token after validating that the second token is signed by the identity and access management service and wherein the CA provides the second certificate after verifying one or more permissions of the second service.

The second service may obtain the second certificate in response to a certificate signing request provided by the second service to the CA. A given service in one service group can identify one or more services in another service group using one or more certificates signed by the CA.

The particular processing operations and other network functionality described in conjunction with the pseudo code of FIG. 4, the communication diagrams of FIGS. 5 through 7 and/or the flow diagram of FIG. 8, for example, are presented by way of illustrative example only, and should not be construed as limiting the scope of the disclosure in any way. Alternative embodiments can use other types of processing operations to provide two-way secure channels between multiple services across service groups where the certification is performed by a CA in one of the planes, using the disclosed techniques. For example, the ordering of the process steps may be varied in other embodiments, or certain steps may be performed concurrently with one another rather than serially. In one aspect, the process can skip one or more of the actions. In other aspects, one or more of the actions are performed simultaneously. In some aspects, additional actions can be performed.

In one or more embodiments, the disclosed techniques for providing two-way secure channels between multiple services across service groups augment a deployment flow to securely copy a CA certificate and OIDC provider credentials to the data plane. In this manner, the data plane can obtain its CSR signed by a trusted certificate signing service without risking a MITM attack. The data plane certificates are not required to be generated by the control plane, and the data plane does not have to have its own CA.

In addition, a data plane certificate can be signed by a CA in the control plane. Thus, the control plane can identify data plane services via the TLS handshake and thereby avoid a risk of a MITM attack. Further, control plane services are configured with the CA, thereby allowing the data plane to identify control plane services via the TLS handshake and thereby avoid a risk of a MITM attack.

Among other benefits, the disclosed techniques for providing two-way secure channels between multiple services across service groups are scalable to support many certificates and/or intermediate CAs in the data plane and enable a customer root CA to be anchored with a single intermediate CA to establish a chain of trust. Thus, control and data plane certificates can be rotated as frequently as required by customer security guidelines.

Figure 9:
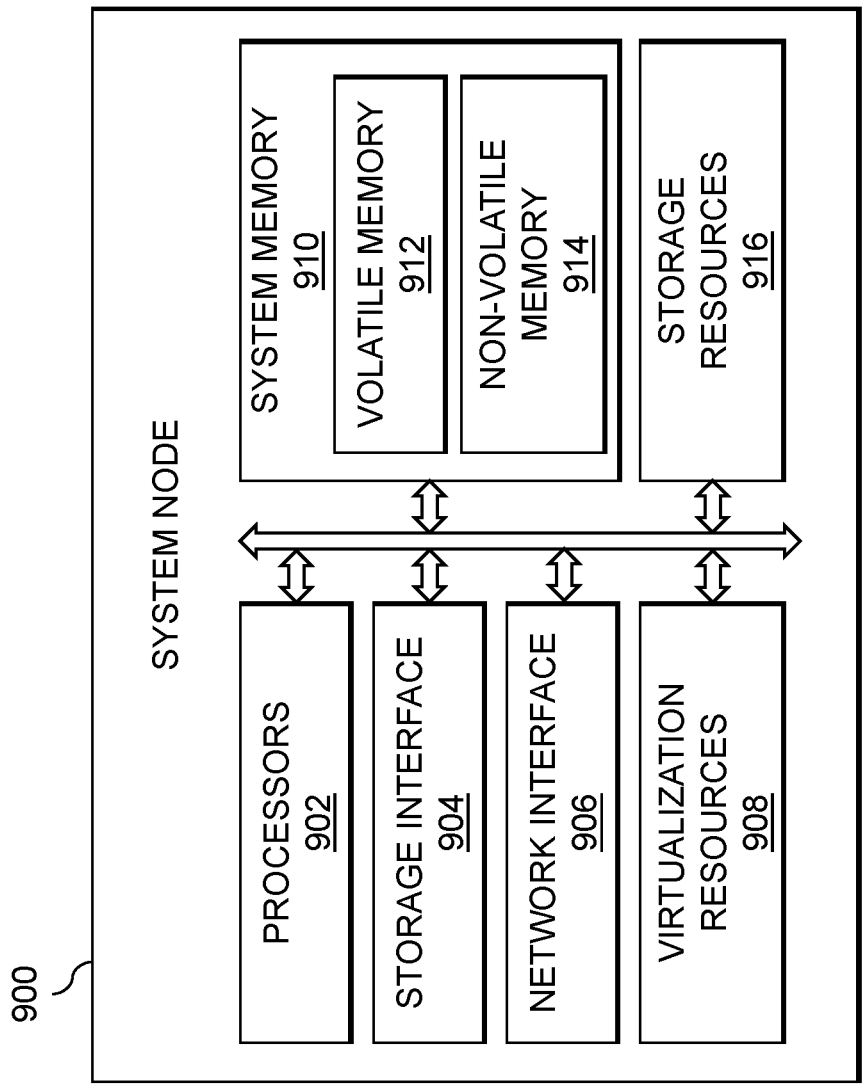
FIG. 9 schematically illustrates a system node which can be implemented in the system of FIG. 1 for hosting a software-defined storage system, or portions thereof, according to an exemplary embodiment of the disclosure.

FIG. 9 schematically illustrates a system node 900 that can be implemented in the system 100 of FIG. 1 for hosting a software-defined storage control system, or portions thereof, according to an exemplary embodiment of the disclosure. In particular, FIG. 9 schematically illustrates an exemplary hardware architecture of a server node 130, a data storage resource 150 and/or a software-defined storage manager 160 of FIG. 1, or portions thereof. The system node 900 comprises processors 902, storage interface circuitry 904, network interface circuitry 906, virtualization resources 908, system memory 910, and storage resources 916. The system memory 910 comprises volatile memory 912 and non-volatile memory 914.

The processors 902 comprise one or more types of hardware processors that are configured to process program instructions and data to execute a native operating system (OS) and applications that run on the system node 900. For example, the processors 902 may comprise one or more CPUs, microprocessors, microcontrollers, application specific integrated circuits (ASICs), field programmable gate arrays (FPGAs), and other types of processors, as well as portions or combinations of such processors. The term "processor" as used herein is intended to be broadly construed so as to include any type of processor that performs processing functions based on software, hardware and/or firmware. For example, a "processor" is broadly construed so as to encompass all types of hardware processors including, for example, (i) general purpose processors which comprise "performance cores" (e.g., low latency cores), and (ii) workload-optimized processors, which comprise any possible combination of multiple "throughput cores" and/or multiple hardware-based accelerators. Examples of workload-optimized processors include, for example, graphics processing units (GPUs), digital signal processors (DSPs), system-on-chip (SoC), tensor processing units (TPUs), image processing units (IPUs), deep learning accelerators (DLAs), artificial intelligence (AI) accelerators, and other types of specialized processors or coprocessors that are configured to execute one or more fixed functions.

The storage interface circuitry 904 enables the processors 902 to interface and communicate with the system memory 910, the storage resources 916, and other local storage and off-infrastructure storage media, using one or more standard communication and/or storage control protocols to read data from or write data to volatile and non-volatile memory/ storage devices. Such protocols include, but are not limited to, NVMe, PCIe, PATA, SATA, Serial Attached SCSI (SAS), and Fibre Channel. The network interface circuitry 906 enables the system node 900 to interface and communicate with a network and other system components. The network interface circuitry 906 comprises network controllers such as network cards and resources (e.g., network interface controllers (NICs) (e.g., SmartNICs, RDMA-enabled NICs), Host Bus Adapter (HBA) cards, Host Channel Adapter (HCA) cards, I/O adaptors, and converged Ethernet adaptors) to support communication protocols and interfaces including, but not limited to, PCIe, DMA and RDMA data transfer protocols.

The virtualization resources 908 can be instantiated to execute one or more services or functions which are hosted by the system node 900. For example, the virtualization resources 908 can be configured to implement the various modules and functionalities of the server node 130 of FIG. 1. In one embodiment, the virtualization resources 908 comprise virtual machines that are implemented using a hypervisor platform which executes on the system node 900, wherein one or more virtual machines can be instantiated to execute functions of the system node 900. As is known in the art, virtual machines are logical processing elements that may be instantiated on one or more physical processing elements (e.g., servers, computers, or other processing devices). That is, a "virtual machine" generally refers to a software implementation of a machine (i.e., a computer) that executes programs in a manner similar to that of a physical machine. Thus, different virtual machines can run different operating systems and multiple applications on the same physical computer.

A hypervisor is an example of what is more generally referred to as "virtualization infrastructure." The hypervisor runs on physical infrastructure, e.g., CPUs and/or storage devices, of the system node 900, and emulates the CPUs, memory, hard disk, network and other hardware resources of the host system, enabling multiple virtual machines to share the resources. The hypervisor can emulate multiple virtual hardware platforms that are isolated from each other, allowing virtual machines to run, e.g., Linux and Windows Server operating systems on the same underlying physical host. The underlying physical infrastructure may comprise one or more commercially available distributed processing platforms which are suitable for the target application.

In another embodiment, the virtualization resources 908 comprise containers such as Docker containers or other types of Linux containers (LXCs). As is known in the art, in a container-based application framework, each application container comprises a separate application and associated dependencies and other components to provide a complete filesystem, but shares the kernel functions of a host operating system with the other application containers. Each application container executes as an isolated process in user space of a host operating system. In particular, a container system utilizes an underlying operating system that provides the basic services to all containerized applications using virtual-memory support for isolation. One or more containers can be instantiated to execute one or more applications or functions of the system node 900 as well as execute one or more of the various modules and functionalities of the control systems of FIG. 1, as discussed herein. In yet another embodiment, containers may be used in combination with other virtualization infrastructure such as virtual machines implemented using a hypervisor, wherein Docker containers or other types of LXCs are configured to run on virtual machines in a multi-tenant environment.

The various software modules of the control systems and the storage block balancing modules that provide two-way secure channels between two services comprise program code that is loaded into the system memory 910 (e.g., volatile memory 912), and executed by the processors 902 to perform respective functions as described herein. In this regard, the system memory 910, the storage resources 916, and other memory or storage resources as described herein, which have program code and data tangibly embodied thereon, are examples of what is more generally referred to herein as "processor-readable storage media" that store executable program code of one or more software programs. Articles of manufacture comprising such processor-readable storage media are considered embodiments of the disclosure. An article of manufacture may comprise, for example, a storage device such as a storage disk, a storage array or an integrated circuit containing memory. The term "article of manufacture" as used herein should be understood to exclude transitory, propagating signals.

The system memory 910 comprises various types of memory such as volatile RAM, NVRAM, or other types of memory, in any combination. The volatile memory 912 may be a dynamic random-access memory (DRAM) (e.g., DRAM DIMM (Dual In-line Memory Module), or other forms of volatile RAM. The non-volatile memory 914 may comprise one or more of a NAND Flash storage device, an SSD device, or other types of next generation non-volatile memory (NGNVM) devices. The system memory 910 can be implemented using a hierarchical memory tier structure wherein the volatile memory 912 is configured as the highest-level memory tier, and the non-volatile memory 914 (and other additional non-volatile memory devices which comprise storage-class memory) is configured as a lower level memory tier which is utilized as a high-speed load/ store non-volatile memory device on a processor memory bus (i.e., data is accessed with loads and stores, instead of with I/O reads and writes). The term "memory" or "system memory" as used herein refers to volatile and/or non-volatile memory which is utilized to store application program instructions that are read and processed by the processors 902 to execute a native operating system and one or more applications or processes hosted by the system node 900, and to temporarily store data that is utilized and/or generated by the native OS and application programs and processes running on the system node 900. The storage resources 916 can include, for example, one or more HDDs and/or SSD storage devices.

It is to be understood that the above-described embodiments of the disclosure are presented for purposes of illustration only. Many variations may be made in the particular arrangements shown. For example, although described in the context of particular system and device configurations, the techniques are applicable to a wide variety of other types of information processing systems, computing systems, data storage systems, processing devices and distributed virtual infrastructure arrangements. In addition, any simplifying assumptions made above in the course of describing the illustrative embodiments should also be viewed as exemplary rather than as requirements or limitations of such embodiments. Numerous other alternative embodiments within the scope of the appended claims will be readily apparent to those skilled in the art.

What is claimed is:

1. A method, comprising:
    providing, by a first service in a first service group, a first handshake communication with a first token to a second service in a second service group, wherein the first service obtains the first token by authenticating with an identity and access management service having a first certificate signed by a certificate authority associated with the first service group, wherein the first handshake communication between the first service and the second service succeeds in response to the second service having a second certificate signed by the certificate authority, and wherein the second service obtains a second token by authenticating with the identity and access management service having the first certificate;
    receiving, by the first service, a second handshake communication from the second service with the second token; and
    enabling communications between the first service and the second service over a two-way authenticated channel in response to the first service having a third certificate signed by the certificate authority;
    wherein the method is performed by at least one processing device comprising a processor coupled to a memory.

2. The method of claim 1, wherein a trust of the certificate authority is established in one or more of: (i) the first service group by storing a public key of the certificate authority to a data store of one or more services in the first service group, and (ii) the second service group by storing the public key of the certificate authority to a data store of one or more services in the second service group.

3. The method of claim 1, wherein one or more services in the first service group perform an onboarding of one or more of at least one service and at least one server in the second service group.

4. The method of claim 1, wherein a deployment of the second service, by a deployment service in the first service group using a secure protocol, comprises:
    establishing a role for the second service with the certificate authority;
    registering the second service with the identity and access management service to obtain credentials for the second service with the identity and access management service;
    storing a public key of the certificate authority in a data store of the second service; and
    storing the credentials of the second service with the identity and access management service in a data store of the second service.

5. The method of claim 1, wherein the second service uses a third token obtained from the identity and access management service to authenticate with the certificate authority to obtain a fourth token from the certificate authority, and wherein the second service uses the fourth token from the certificate authority to obtain the second certificate signed from the certificate authority.

6. The method of claim 5, wherein the certificate authority provides the third token after validating that the second token is signed by the identity and access management service and wherein the certificate authority provides the second certificate after verifying one or more permissions of the second service.

7. The method of claim 1, wherein the second service obtains the second certificate in response to a certificate signing request provided by the second service to the certificate authority.

8. The method of claim 1, wherein the first service comprises one or more of a management service and a deployment service in a trusted control plane and wherein the second service comprises a data plane service in a data plane.

9. The method of claim 1, wherein the first service obtains the third certificate using a certificate management service in the first service group.

10. The method of claim 1, wherein the identity and access management service employs token-based authentication.

11. The method of claim 1, wherein a given service identifies one or more additional services in another service group using one or more certificates signed by the certificate authority.

12. An apparatus comprising:
    at least one processing device comprising a processor coupled to a memory;
    the at least one processing device being configured to implement the following steps:
    providing, by a first service in a first service group, a first handshake communication with a first token to a second service in a second service group, wherein the first service obtains the first token by authenticating with an identity and access management service having a first certificate signed by a certificate authority associated with the first service group, wherein the first handshake communication between the first service and the second service succeeds in response to the second service having a second certificate signed by the certificate authority, and wherein the second service obtains a second token by authenticating with the identity and access management service having the first certificate;
    receiving, by the first service, a second handshake communication from the second service with the second token; and
    enabling communications between the first service and the second service over a two-way authenticated channel in response to the first service having a third certificate signed by the certificate authority.

13. The apparatus of claim 12, wherein one or more services in the first service group perform an onboarding of one or more of at least one service and at least one server in the second service group.

14. The apparatus of claim 12, wherein the first service comprises one or more of a management service and a deployment service in a trusted control plane and wherein the second service comprises a data plane service in a data plane.

15. The apparatus of claim 12, wherein the first service obtains the third certificate using a certificate management service in the first service group.

16. The apparatus of claim 12, wherein a given service identifies one or more additional services in another service group using one or more certificates signed by the certificate authority.

17. A non-transitory processor-readable storage medium having stored therein program code of one or more software programs, wherein the program code when executed by at least one processing device causes the at least one processing device to perform the following steps:

provinding, by a first service in a first service group, a first handshake communication with a first token to a second service in a second service group, wherein the first service obtains the first token by authenticating with an identity and access management service having a first certificate signed by a certificate authority associated with the first service group, wherein the first handshake communication between the first service and the second service succeeds in response to the second service having a second certificate signed by the certificate authority, and wherein the second service obtains a second token by authenticating with the identity and access management service having the first certificate;

receiving, by the first service, a second handshake communication from the second service with the second token; and enabling communications between the first service and the second service over a two-way authenticated channel in response to the first service having a third certificate signed by the certificate authority.

18. The non-transitory processor-readable storage medium of claim 17, wherein one or more services in the first service group perform an onboarding of one or more of at least one service and at least one server in the second service group.

19. The non-transitory processor-readable storage medium of claim 17, wherein the first service comprises one or more of a management service and a deployment service in a trusted control plane and wherein the second service comprises a data plane service in a data plane.

20. The non-transitory processor-readable storage medium of claim 17, wherein a given service identifies one or more additional services in another service group using one or more certificates signed by the certificate authority.

\* \* \* \* \*